United States Patent
Sharma et al.

(10) Patent No.: US 11,994,976 B2
(45) Date of Patent: May 28, 2024

(54) METHODS, SYSTEMS, AND MEDIA FOR A MICROSERVICES ORCHESTRATION ENGINE

(71) Applicant: Capital One Services, LLC, McLean, VA (US)

(72) Inventors: Neeraj Sharma, Glen Allen, VA (US); Jeffrey A. Tyree, Powhatan, VA (US); Suresh Vadigi, Kennett Square, PA (US); Siwatm Piyasirisilp, Herndon, VA (US); Andrew Troy Hartwell, Prosper, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/079,763

(22) Filed: Oct. 26, 2020

(65) Prior Publication Data
US 2022/0129367 A1    Apr. 28, 2022

(51) Int. Cl.
*G06F 11/36* (2006.01)
*G06F 9/54* (2006.01)

(52) U.S. Cl.
CPC .......... *G06F 11/3664* (2013.01); *G06F 9/547* (2013.01); *G06F 11/3696* (2013.01)

(58) Field of Classification Search
CPC ... G06F 11/3664; G06F 9/547; G06F 11/3696
See application file for complete search history.

(56) References Cited

U.S. PATENT DOCUMENTS

| | | | |
|---|---|---|---|
| 6,163,805 A | 12/2000 | Silva et al. | |
| 8,117,219 B2 | 2/2012 | Dunki et al. | |
| 8,566,286 B1 | 10/2013 | Hawton et al. | |
| 8,904,239 B2 | 12/2014 | Seren et al. | |
| 9,529,699 B2 | 12/2016 | Rajan et al. | |
| 10,083,110 B2 | 9/2018 | Kaser et al. | |
| 10,178,045 B2 * | 1/2019 | Kumar | H04L 47/829 |
| 10,210,074 B1 | 2/2019 | Szerenyi | |

(Continued)

OTHER PUBLICATIONS

R. Siblini et al. "Testing Web Services," 2005 [retrieved on Feb. 21, 2023], 3rd ACS/IEEE International Conference on Computer Systems and Applications, pp. 1-8, downloaded from <url>:https://ieeexplore.IEEE.org. (Year: 2005).

(Continued)

*Primary Examiner* — Daxin Wu
(74) *Attorney, Agent, or Firm* — Sterne, Kessler, Goldstein & Fox P.L.L.C.

(57) ABSTRACT

Systems, methods and media are directed to a microservices orchestration engine, which includes an engine framework and an orchestrator. The engine framework combines an input request with framework specifications to form a job stream and define communication between the orchestrator and microservice provision components that execute microservices to be executed in a non-production environment during a test of computer-executable code. The orchestrator receives the formed job stream and sends a plurality of tasks based on the formed job stream. The tasks are executed by respective microservice provision components that execute microservices, enabling the test of computer-executable code in the non-production environment.

20 Claims, 5 Drawing Sheets

(56) References Cited

U.S. PATENT DOCUMENTS

| | | | |
|---|---|---|---|
| 10,235,676 | B2 | 3/2019 | Choe et al. |
| 10,437,712 | B1 | 10/2019 | Tyler et al. |
| 10,489,864 | B1 | 11/2019 | Werr |
| 10,540,259 | B1* | 1/2020 | Kramer ............... G06F 11/3636 |
| 11,550,565 | B1 | 1/2023 | VanAntwerp et al. |
| 2008/0086499 | A1 | 4/2008 | Wefers et al. |
| 2013/0054792 | A1 | 2/2013 | Sharaf |
| 2013/0263098 | A1 | 10/2013 | Duda et al. |
| 2014/0047342 | A1 | 2/2014 | Breternitz et al. |
| 2014/0082593 | A1 | 3/2014 | Alper et al. |
| 2014/0109055 | A1 | 4/2014 | Gibbens et al. |
| 2014/0181042 | A1 | 6/2014 | Toyama et al. |
| 2016/0085663 | A1 | 3/2016 | Best |
| 2016/0124742 | A1* | 5/2016 | Rangasamy ........ H04L 41/0803 717/103 |
| 2017/0023920 | A1* | 1/2017 | Pawlus ................. G05B 17/02 |
| 2017/0038919 | A1 | 2/2017 | Moss et al. |
| 2017/0277627 | A1 | 9/2017 | Ellis et al. |
| 2017/0286265 | A1 | 10/2017 | Moth et al. |
| 2017/0364434 | A1* | 12/2017 | Kairali ................ G06F 11/3668 |
| 2018/0039565 | A1* | 2/2018 | Rajagopalan ......... G06F 3/0482 |
| 2018/0181378 | A1 | 6/2018 | Bakman |
| 2019/0065353 | A1 | 2/2019 | Tammariello et al. |
| 2019/0095258 | A1* | 3/2019 | Chandrasekaran ..... G06F 9/547 |
| 2019/0095320 | A1 | 3/2019 | Biswas et al. |
| 2019/0220305 | A1* | 7/2019 | Festa ..................... G06F 21/554 |
| 2019/0294519 | A1 | 9/2019 | Garg et al. |
| 2019/0324897 | A1* | 10/2019 | Subramanian ...... G06F 11/3664 |
| 2019/0333069 | A1* | 10/2019 | Noble ................. G06Q 20/405 |
| 2020/0089599 | A1* | 3/2020 | Hegarty ............. G06F 11/3684 |
| 2020/0159653 | A1 | 5/2020 | Raghupathy et al. |
| 2020/0250074 | A1* | 8/2020 | Zhang ................ G06F 11/3688 |
| 2020/0287982 | A1* | 9/2020 | Dinh .................... H04L 67/562 |
| 2020/0320557 | A1 | 10/2020 | Fuchs |
| 2020/0396225 | A1* | 12/2020 | Bhatia ................. H04L 63/102 |
| 2021/0072965 | A1* | 3/2021 | Masters ................ G06F 8/60 |
| 2021/0096979 | A1 | 4/2021 | Fasheh et al. |
| 2021/0141712 | A1* | 5/2021 | Gevorkyan ........ G06F 11/3696 |
| 2021/0240551 | A1* | 8/2021 | Joyce .................... G06F 9/541 |
| 2021/0264805 | A1 | 8/2021 | Delaney et al. |
| 2021/0279047 | A1* | 9/2021 | McLaren ................ G06F 8/71 |
| 2021/0294732 | A1 | 9/2021 | Underseth |
| 2021/0390011 | A1 | 12/2021 | Cser et al. |
| 2022/0100649 | A1* | 3/2022 | Pönitsch ............. G06F 11/3414 |

OTHER PUBLICATIONS

Dong Qiu et al., "Regression Testing of Web Service: A Systematic Mapping Study," 2014 [retrieved on May 19, 2023], ACM Computing Surveys, vol. 47, Issue 2, Article No. 21, pp. 1-46, downloaded from <url>:https://dl.acm.org. (Year: 2014).

* cited by examiner

METHODS, SYSTEMS, AND MEDIA FOR A MICROSERVICES ORCHESTRATION ENGINE

BACKGROUND

When creating or updating features for web sites and applications, developers have a number of tools to make and implement changes at their disposal. The tools involved in this work are themselves constantly being improved. While the work to build web site and application features can at times be difficult, creation is merely the first step in the process. Testing is also an integral component in these code-developing efforts.

During this part of the cycle, developers will use artificial or dummy accounts to gauge the effects of the changes under test. Often times that use will be not for just a single test account, but for a number of fictitious yet realistic accounts that present a wide variety of scenarios and situations to simulate the real-world functioning of the site/application. Moreover, the underlying business processes may be constantly evolving and changing, leading to even more difficulties in testing.

For at least these reasons, testing systems would be improved if developers were able to automatically generate requests for test accounts for a non-production environment.

BRIEF DESCRIPTION OF THE DRAWINGS

Descriptions are given with reference to the figures included herein. When possible and for clarity, reference numbers are kept consistent from figure to figure. Some of the figures are simplified diagrams, which are not to be interpreted as drawn to scale or spatially limiting for the described embodiments. Where appropriate, the particular perspective or orientation of a figure will be given to increase understanding of the depicted features.

DETAILED DESCRIPTION

Developers for financial services institutions like banks and other credit providers face additional challenges not faced by software developers for other industries, due to the difficulty of producing test accounts. Privacy regulations in many jurisdictions prevent the use of live customer data, which can make requesting test accounts and simulation data in and of itself a complicated process. When adding the complexities of the evolving business practices of a large financial institution into these challenges, the test environment can be an impossible labyrinth of procedures, resources and headaches.

Thus, having the proper business processes in place, cascaded throughout the environment, would reduce the difficulties developers face. Relatedly, the testing process could be advanced if these advantages were tied together, along with a number of other disparate systems, into a single orchestrated developer environment that allowed for easy modification and understanding. As such, embodiments of the present disclosure are directed to methods, media, and systems for testing computer-executable code. More specifically, embodiments of the application provide for a microservices orchestration engine (MOE) to enable testing of code.

The components and/or architectural elements described below can be employed in an overall software development system to aid developers across a range of activities. These and other embodiments can be particularly useful for a financial institution such as a bank, credit union, or credit card provider. As a single source of developer tools, various applications can be used within the environment to overcome challenges specific to the industry.

The combination of regulatory and technical complications associated with the security of information for financial institutions creates a unique set of challenges that this system addresses. Primary among those impediments are the complexity of the constituent pieces involved, the interconnected nature of the sub-systems and processes, and the specificity of each. To meet and overcome those hurdles, the disclosed system reduces the burden placed on a developer with respect to required background knowledge. The described sub-systems, elements and tools also work together to provide interconnected solutions across the development life cycle.

Starting with the business processes that underly each of the phases that a developer must address, the overall development architecture disclosed in this application can be used to guide a software innovation in the financial services field from start to finish. Once business processes are identified (with or without the use of the specific tools of this system, such as found in "METHODS, SYSTEMS, AND MEDIA FOR GENERATING AN UPDATED WORKFLOW FOR AN OPERATION EXECUTABLE BY A COMPUTING DEVICE", Ser. No. 17/079,767), the software development environment can be used to create test users and accounts (as in "GENERATING TEST ACCOUNTS IN A CODE-TESTING ENVIRONMENT", Ser. No. 17/079,758). A developer can further test users and accounts through each phase of a variety of transactions expected of those users/accounts, and even test processes with outside vendors and third parties which previously had no means for testing (found in "METHODS, SYSTEMS, AND MEDIA FOR GENERATING TEST AUTHORIZATION FOR FINANCIAL TRANSACTIONS", Ser. No. 17/183,598 and "METHODS, SYSTEMS, AND MEDIA FOR ACCESSING DATA FROM A SETTLEMENT FILE", Ser. No. 17/183,579).

The phase-by-phase analysis of code under development can also be used to test recurring transactions, interconnected transactions (e.g., authorization and settlement), or produce negative testing/edge testing scenarios of a completely hypothetical nature. The ability to connect the various processes can allow a developer to probe the interactions that occur due to changes in existing products and services, as well as explore the performance of code for new products and services. The architecture and implementation of the disclosed systems have been created in such a way as to also provide "cascading" updates. The level of abstraction within the disclosed framework ensures that changes made at one point in the system are reflecting in related processes elsewhere in the development architecture (e.g., alterations made in generating test accounts that should affect other testing tools are updated in those other applications).

Using the disclosed MOE, developers are able to automatically generate requests for test accounts for a non-production environment such as a testing or quality assurance (QA) environment. Additionally, business processes can be cascaded throughout the environment in a manner that eliminates the use of detailed programming knowledge or understanding of back-end processes. Once in place, test accounts can be generated using the MOE, and test accounts can be further tested for processes such as transaction authorizations or account settlement. Overall, disparate systems are tied together into a single orchestrated developer environment that permits easy, global modifications along with significant reductions in duplicated efforts.

While no single technical specification or standard exists defining microservices, for the purposes of this application they are granular processes that fulfill a narrow goal while remaining as technology-agnostic as possible. Microservices are typically delivered across a network and may be deployed independently. They are only related in a very loose manner, which allows for implementing and updating individual microservices, rather than entire applications or architectures. While the loose ties between processes makes for easier changes and improvements, it also creates additional challenges in terms of coordination. Because that coordination can occur across numerous servers and domains, a tool known as an orchestrator may be utilized to manage workflows, timing, and every other manner of complex instruction that weaves these microservices together into larger, useful systems.

As part of the disclosed methods, media and systems, an MOE receives a request to initiate a microservices process. The microservice process is to be executed in a non-production environment during a test of computer-executable code. The request is received from a user interface of a developer tool. In response to the request, an orchestration engine framework is queried to determine the microservices invoked by the request.

Tasks for microservices are sent based on the invoked microservices. Tasks for completion are sent to respective microservice components that execute the invoked microservices. The MOE receives completed microservices communications regarding the completed plurality of tasks that enable the test of computer-executable code. The completed responses to the input request and corresponding microservices communications that enable the test of computer-executable code are then sent from the MOE to the user interface of the developer tool. All of this is coordinated by an orchestrator, which serves as a coordinator for timing and process.

The microservices orchestration engine enables the above improvements to the testing environment. The MOE can include an engine framework and an orchestrator. The engine framework can be implemented with one or more extensible markup language files. As an example, the engine framework can be a Java Script Object Notation (JSON) file. The engine framework can be embodied with instructions for coordinating the input request received from the user interface and the microservices components communicating with the orchestrator.

The engine framework can combine an input request, received from a user interface, with framework specifications to form a job stream. The input request can be a test account generation request or a business workflow generation request. In other embodiments of the system, inputs can be requested for test transaction authorizations or accounts settlements. The formed job stream can include application programming interface API calls, Simple Object Access Protocol (SOAP) service calls, database calls, cloud services calls, and/or mainframe emulator communications.

The engine framework also defines communication between an orchestrator and the various microservice provision components that execute microservices in a non-production environment. The orchestrator can receive the formed job stream and send tasks based on the formed job stream. The tasks are executed by respective microservice provision components that execute microservices, which in turn enables the test of computer-executable code in the non-production environment.

The orchestrator can be configured to format communications enabling the tasks prior to sending the tasks to a task queue. The orchestrator can be configured to format communications to schedule one or more tasks, to alter a data format, to request a permission, to authorize a transaction, or to test for errors. In embodiments, the orchestrator can be configured to format files for third-party processing, such as authorization or settlement files.

Figure 1:
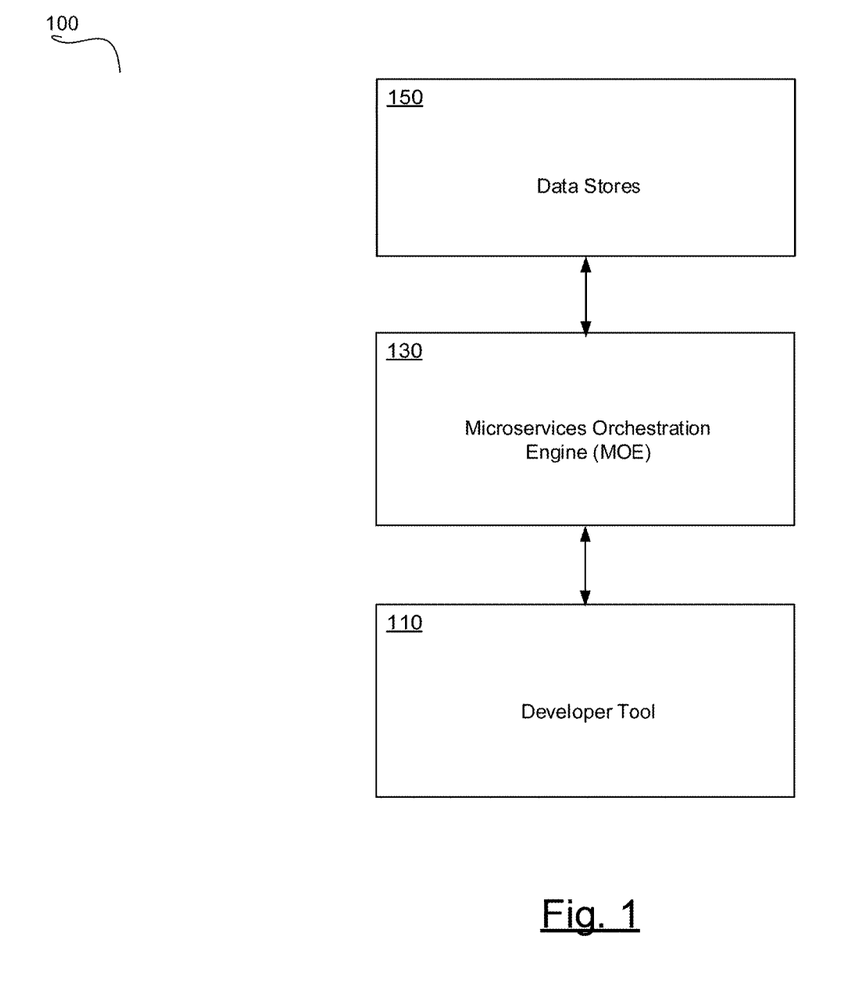
FIG. 1 is high-level block diagram of a system for testing computer-executable code, according to an embodiment of the disclosure.

FIG. 1 is a high-level block diagram of a system 100 for testing executable code, in accordance with embodiments of the present disclosure. System 100 includes developer tool 110, microservices orchestration engine (MOE) 130, and data store(s) 150. In examples, data stores 150 can include microservice components and/or any data associated with those microservices. Data stores 150 can include a plurality of servers, which in accordance with embodiments of the present disclosure, may be local servers, disparate servers, or a combination thereof. As shown in FIG. 1, developer tool 110 is configured to communicate with MOE 130, and MOE 130 is configured to communicate with data stores 150.

Developer tool 110 includes a test account generator for generating test accounts and a business workflow generator. The test account generator of developer tool 110 further includes various fields of information, which are used in the test account generation process. The business workflow generator of developer tool 110 further includes a plurality of operations available in a microservices environment. Developer tool 110 is configured to transmit to MOE 130 fields of information used in the request to create one or more test accounts (or that are part of the test accounts themselves) or to transmit a selection of an operation from among the plurality of operations available to the business workflow generator. As an example, if the request is for a quantity of test accounts, each having specified products or parameters, each aspect of that request will be included in the fields of information.

Developer tool 110 is also configured to request permission to access data stores 150. The data stores 150 contain data corresponding to at least a portion of the fields of information or the various operations available in a microservices environment. Responsive to the necessary permissions being granted, data stores 150 transmit a data set or a segment of computer-executable code to MOE 130. In some embodiments, the data set can include data corresponding to the fields of information which in turn relate to a test account. This data set may be artificially generated to replicate anonymized real-world data. In alternative embodiments, the segment of code can correspond to the operations available in a microservices environment that will be updated by the business workflow generator.

Responsive to receiving the completed data set or the segment of code from the data stores 150, MOE 130 is configured to forward the data set/segment to developer tool 110. In some embodiments, test accounts generated can be tested in a non-production environment. Examples of a non-production environment can include a code-testing environment or a quality assurance (QA) environment. In some embodiments, the segment of code can be modified to generate a workflow for updating an operation executable by a computing device.

Data stores 150 can belong to, or otherwise be affiliated with, an institution implementing developer tool 110 (i.e., an internal data store). Alternatively, data stores 150 can belong to, or otherwise be affiliated with, external third parties outside of the institution implementing developer tool 110 (i.e., an external data store). Examples of third parties to whom data stores 150 may belong or with whom data stores 150 may otherwise be affiliated include credit bureaus, credit reporting agencies, medical facilities, and/or educational institutions.

Various communications protocols enable communications between development tool 110, MOE 130, and data stores 150. The same or different protocols can enable requests between development tool 110 and MOE 130 as those that also enable the access requests between MOE 130 and data stores 150. The protocols can include, but are not limited to, calls to databases, mainframes, and application programming interfaces (APIs), as well as calls between cloud services and cloud files, schedulers and scheduler calls, and/or other suitable means of communicating between the various components. Furthermore, the test accounts or segments of code can be constructed through a combination of Simple Object Access Protocol (SOAP) service calls, Oracle and/or SQL database calls, calls to miscellaneous databases, database (DB) gateway calls, Representational state transfer (RESTful) application programming interface (API) calls, T-SYS mainframe emulator communications, third-party data source communications, cloud services files, and/or scheduler calls.

As an example, a developer using developer tool 110 can create code for a feature which leads to a request for 10 test accounts. Based on the feature under development or simply the development preferences of the developer, the test accounts will be specified as each having a checking account with a particular minimum balance. The requested test accounts can also be specified as each having at least one credit card with a particular range of credit limits.

Each aspect of that request will be included in the fields of information transmitted from developer tool 110 to MOE 130 and eventually from MOE 130 to data stores 150. Based on the request, data stores 150 will provide the requisite information back to MOE 130, which will in turn be transmitted to developer tool 110 in the form of the 10 requested test accounts. Through the entire process, developer awareness can be reduced to the high-level parameters of the test accounts, without delving into the specifics of the requests, permissions, formatting or the like. Moreover, MOE 130 can coordinate all of the requests, timing requirements, and conversions/translations that should occur between the various components completing the process.

As another example, the business workflow generator in developer tool 110 can update a feature displaying a piece of information after a change of address for a user profile. The developer can use developer tool 110, in conjunction with MOE 130 and data stores 150, to pull the microservice calls for an account number and the address field. Rather than show any accessed or changed information, the developer can alter the notification to the date and/or timestamp of the change. Developer tool 110 will then communicate with MOE 130 and data stores 150 again to publish this change, thus making it available of other users of system 100. Through the entire process, the developer need only be aware of the desired actions or functions, without delving into the specifics of the requests, permissions, formatting or the like. Once again, MOE 130 can coordinate all aspects of completing the process, such as formatting of requests, timing requirements, and conversions/translations that should occur.

Figure 2:
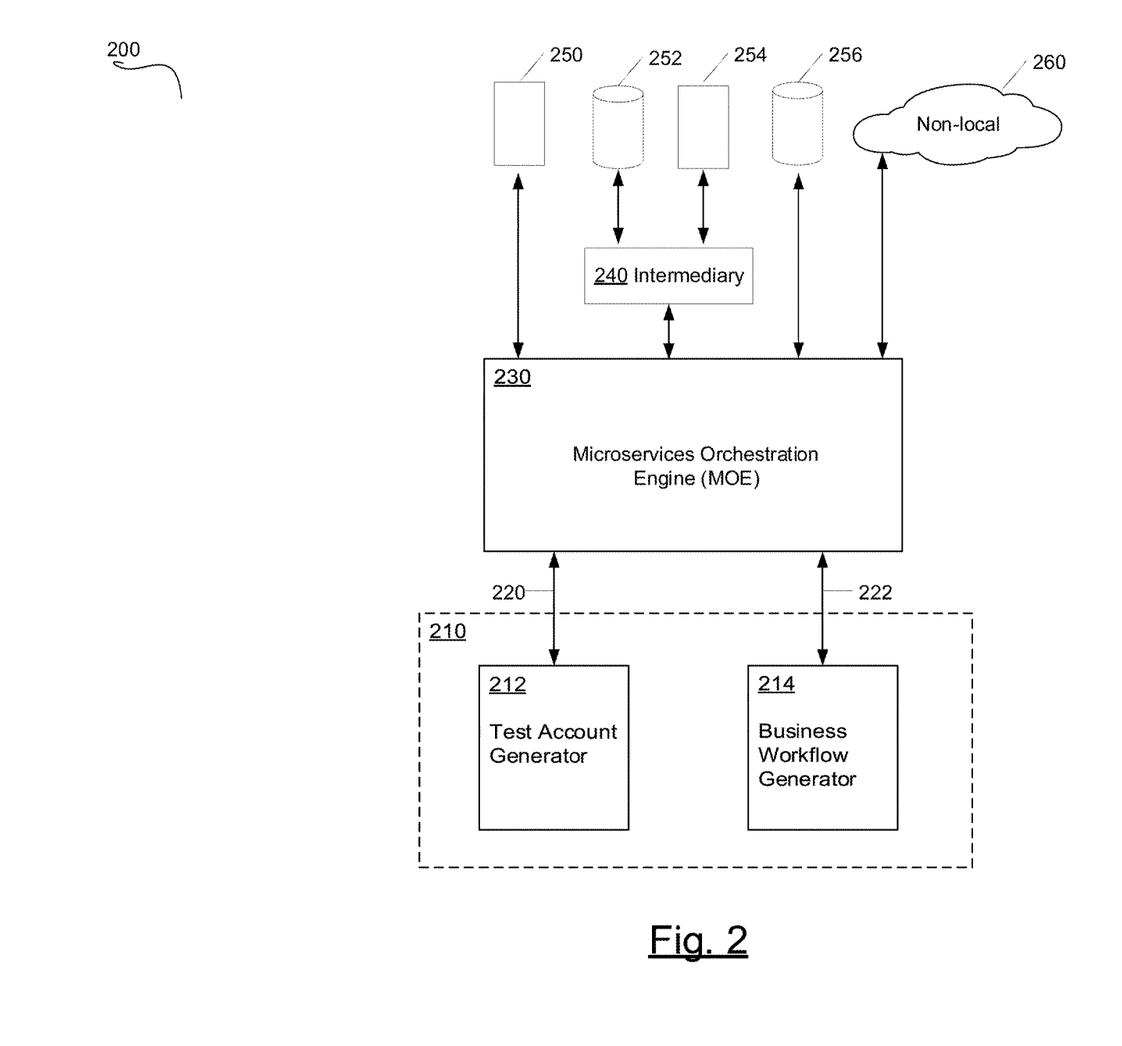
FIG. 2 is system-level diagram of a code-testing environment using a microservices orchestration engine, according to an embodiment of the disclosure.

FIG. 2 illustrates a system 200 for developing code in a code-testing environment. System 200 is consistent with the system depicted in FIG. 1 and provides additional details of certain components in accordance with embodiments of the present disclosure. Included in system 200 are developer tool 210, microservices orchestration engine (MOE) 230, intermediary 240, microservices and storage 250, 252, 254, and 256 (collectively referred to as 'the microservices 25X'), and non-local data stores 260.

As shown in FIG. 2, developer tool 210 can include test account generator 212 and business workflow generator 214. MOE 230 can be configured to communicate with test account generator 212 and business workflow generator 214, through two-way communications 220 and 222, respectively. Test account generator 212 and business workflow generator 214 of developer tool 210 can interact with MOE 230 through protocols, means or components that are either consistent or entirely different from each other.

Responsive to test account generator 212 obtaining the necessary permissions, test account generator 212 is configured to communicate with MOE 230 by way of communication 220. More specifically, test account generator 212 enables a selection of a product of interest from among a selection of products offered (e.g., a credit account by an institution) to be examined by a developer operating in the code-testing environment (i.e., by use of developer tool 210). Furthermore, selection of the product of interest indicates which fields of information are to be included in the generated test account. The indicated fields of information are then transmitted from test account generator 212 to MOE 230.

Responsive to receiving permission (from the microservices 25X and/or non-local data stores 260) to access data corresponding to the indicated fields of information indicated by test account generator 212, the information for a test data set is received by MOE 230. Data corresponding to the indicated fields of information is populated into the appropriate fields of information to generate test accounts. The generated test accounts are then subjected to testing in the code-testing environment.

In embodiments, a developer for a financial institution can use system 200 to generate a specified number of test accounts in a code-testing environment. As an example, using the test account generator 212, an indication may be given of what types of information will be used by features for various lines of credit to be tested. For instance, a developer may indicate interest in a credit card. The selection of lines of credit offered by the financial institution can also include an auto loan, a personal loan, a student loan, or a mortgage. In some examples, indication of the line of credit of interest is made through a user interface, such as a monitor or other display device, a mouse, a keyboard, a touch-sensitive display, a trackpad, a signature pad, or any other suitable user interface device and/or combination thereof.

Responsive to the indication of the line of credit of interest, a list of fields of information corresponding to the line of credit of interest is created and sent to MOE 230 by way of communication 220. Examples of the fields of information may include privacy-protected information such as a name, mailing address, social security, or annual income, among other pieces of PII. Permission to access the microservices 25X and/or non-local data stores 260 to retrieve data corresponding to the fields of information is requested by test account generator 212.

Responsive to permission being granted, the microservices 25X and/or non-local data stores 260 send the requested information to MOE 230. Microservices 25X can include any one or group of servers, SQL databases, Oracle databases, other databases, gateways, cloud files, schedulers, or other components necessary for microservice completion. Information exchanged between MOE 230 and the microservices 25X and the non-local data stores 260 may pass through an intermediary 240. Examples of an intermediary 240 can include any number or variety of mainframes or frameworks, as well as emulators of the same.

Responsive to receipt of the requested information by MOE 230, the information is then forwarded to test account generator 212 through communication 220. Test account generator 212 populates data for the fields of information in the test account to complete generation of the same. Once generated, the test account (effectively an analog for a live account in a production environment) is tested for performance in the code-testing environment. As an example, the test accounts could be placed through a transaction authorization generator to determine outcomes when authorization is attempted on those accounts. Another example can be the testing of settlements on the accounts generated.

As another, more detailed example, a developer can be interested in updating a web-based application process or a portion thereof. For instance, as part of an application for a particular credit card offering, the developer may want to marry information between existing account(s) and the credit card application. The developer may want to eliminate the previously required entry of the account number. As an improvement, the developer instead wants to allow entry of either of the account number or a debit card associated with the account number. The checking/savings account(s) also are understood to have one or more associated debit card numbers.

Following this example, the test account(s) generated have a checking or savings account component (account number), along with a fabricated debit card number associated with that account. Moreover, the developer can order 20 test accounts, all having either a checking or a savings account with a debit number, simply by entering basic information to be assumed. Test account generator 212 can then perform all of the backend processes to generate these accounts, including the data sources from which the information is queried, the required permissions to access that data, and the compilation of the accessed data. Once generated, test accounts generated by test account generator 212 can be stored in such a way as to enable applications under test to pull the requisite information for testing.

Once generated, the developer can check properties of the application process, such as whether the correct values are processed against both the account number and the debit card number. Any discrepancies can be scrutinized in detail, across a number of test accounts. Various permutations and modifications can be made to test across multiple scenarios. All of the testing, however, can take place more quickly and more thoroughly because of the ease of test account generation at the onset.

In embodiments, a selection of an operation from among a plurality of operations available in a microservices environment is made via a user interface of business workflow generator 214. Business workflow generator 214 can receive the selection through any of several input/output operations, such as a drag-and-drop operation, a click, a cursor selection, a button selection, a keyboard input or the like. Input/output devices through which an operation may be selected include a monitor or other display device, a touchscreen or other touch-sensitive device, a mouse, a keyboard, a trackpad, a signature pad, or a combination thereof. The selection is then communicated with MOE 230 via communications 222.

Responsive to receiving the selection of an operation from business workflow generator 214 by way of MOE 230, a configurable computer-executable file corresponding to the selected operation is determined from among those stored at the microservices 25X' and/or data stores 260. For example, the configurable computer-executable file can be a Java Script Object Notation (JSON) file, a Google Protocol Buffer (Protobuf) file, or an extensible markup language (XML) file.

Receiving a selection of an operation may further include receiving an initial field of information used in performing the operation. Furthermore, the segment of computer-executable code corresponding to the selected operation may be one or more of a Simple Object Access Protocol (SOAP) service call, an Oracle database call, a SQL database call, a miscellaneous database call, a database (DB) gateway call, a Representational state transfer (RESTful) application programming interface (API) call, a T-SYS mainframe emulator communication, a third-party data source communication, communications with a cloud services file, and/or a scheduler call An alteration to the selected operation is received, via the user interface of business workflow generator 214 shown in FIG. 2, and a segment of computer-executable code in the computer-executable file corresponding to the operation is updated responsive to the alteration. In some embodiments, updating the segment of computer-executable code responsive to the alteration to the operation may involve generating a segment of computer-executable code without receiving additional user-authored code. For example, business workflow generator 214 may generate the segment of computer-executable code through any of several input/output operations, such as the drag-and-drop operation, click, cursor selection or the like. One or more updated workflows are then generated by business workflow generator 214 based on the updated segment of computer-executable code in the configurable computer-executable file.

Operations that may be altered include one or more of changing a contact method and/or preference, changing a delivery method and/or preference, making information visible via a user interface that was previously not made visible, preventing the display of information (e.g., via a user interface) that was previously made visible, renaming a variable, or specifying a field of information for manipulation among a plurality of fields of information. Examples of variables that may be renamed and/or fields of information which can be manipulated may include a username, a password, a home address, an email address, a phone number, payment information, and/or a preferred payment method.

Information able to be made visible/hidden may include a passphrase, an account number, a social security number, and/or any other piece of personally identifiable information (PII) associated with the account. Additional examples of PII may include: a passport number, a tax identification number, a driver's license number, a student identification number, a patient number, bank account information, a mailing address, and/or an email address. An initial field of information may correspond to existing customer information held by an institution, information regarding a new customer of the institution, new information regarding an existing customer of the institution, or information imported from an external source. In the event the information is privacy protected (e.g., personally identifiable information), handling occurs responsive to the grant of necessary permissions to access the information.

According to embodiments of the present disclosure, the altered segment of computer-executable code may be published to a centralized code repository (e.g., a database or other storage server) for subsequent access and utilization by additional applications operating in the system 200. In some examples, the additional applications may include microservice applications such as the ones stored in microservices 25X or data stores 260. In some embodiments, a developer at a financial institution may use system 200 to generate and/or update workflows, via a user interface, in a non-production (e.g., a code-testing) environment.

As an example, a developer using the user interface of business workflow generator 214 may wish to change the process by which a user's password can be changed. Rather than ask for only the old password, the developer may also wish to ask for a previously determined security question that has a drop-down menu included for the user's selection. Through business workflow generator 214, the developer can select a checking account profile field corresponding to the password, the security question prompt and drop-down menu fields, as well as fields for receiving the new password and verifying the new password.

Passing all of the necessary parts of the change to MOE 230 by way of communications 222, the various microservices 25X and data stores 260 can be queried. At least one segment of computer-executable code that enables all of the various calls and values can be accessed, also from microservices 25X and/or data stores 260. Once the segment of code has been updated to include the new operation, including the security question prompt and drop-down menu entry, it can be stored where appropriate, again by way of MOE 230. Subsequent use of business workflow generator 214 and MOE 230 will then allow other developers access to the updated segment of code.

Figure 3:
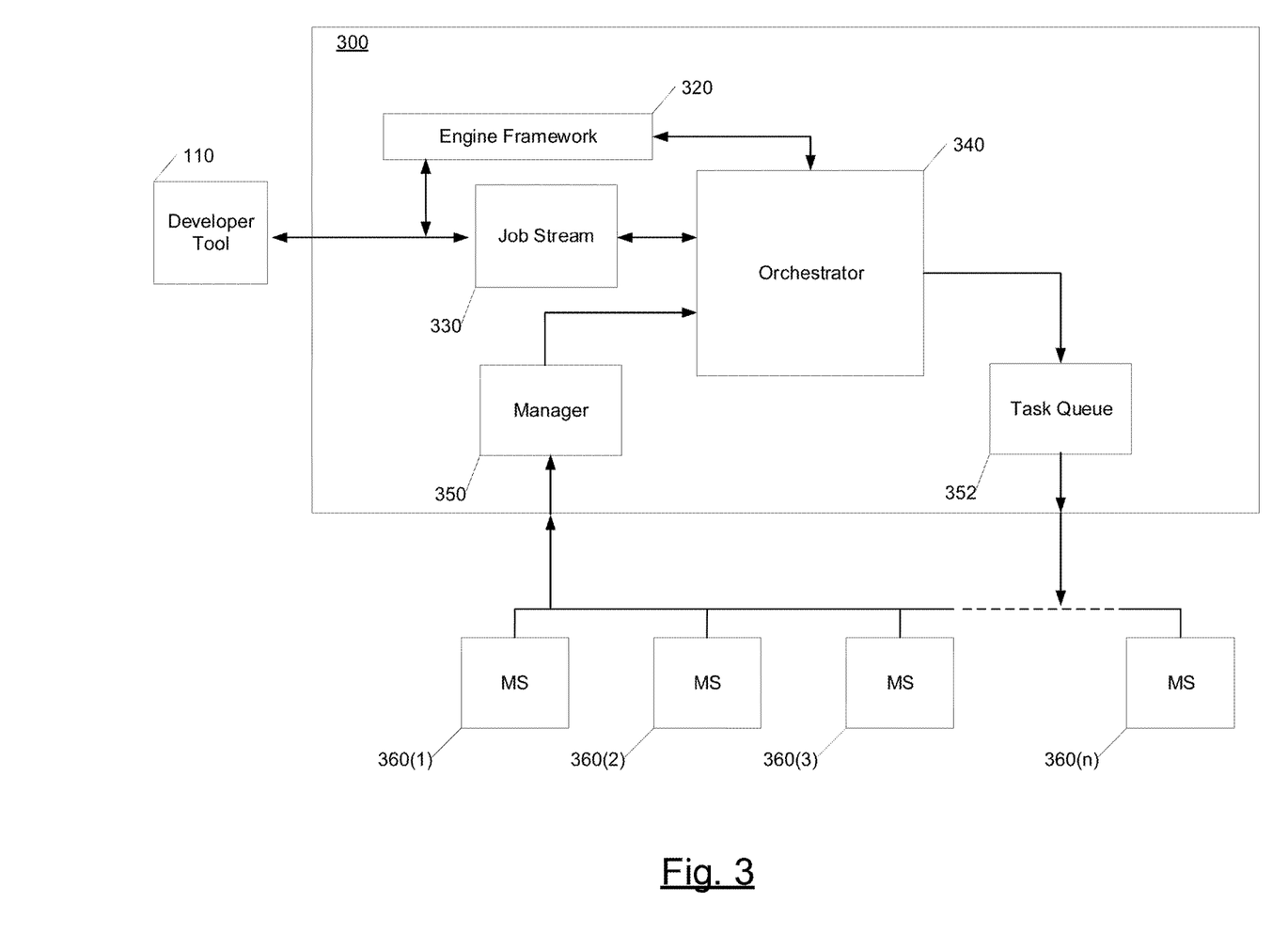
FIG. 3 is a block diagram of a microservices orchestration engine, according to an embodiment of the disclosure.

FIG. 3 depicts a microservices orchestration engine (MOE) 300 for use in a microservices environment. MOE may be substantially similar to MOE 130 and MOE 230 shown in FIGS. 1 and 2 as well as described above. Moreover, MOE 300 includes an engine framework 320 and an orchestrator 340. As shown in FIG. 3, MOE 300 communicates externally in a bi-directional manner with developer tool 110 and microservice provision components 360(1)-360(n) as detailed above and below. Microservice provision components 360(1)-360(n) may be substantially similar to intermediary 240, microservices 25X and data stores 260, shown in FIG. 2 and described above.

Engine framework 320 is configured to combine an input request, shown in FIG. 3 as a bi-directional arrow from developer tool 110, with framework specifications, which are also shown by a bi-directional arrow, to form a job stream 330. The input request is received from a user interface of developer 110 (i.e., from test account generator 212 or business workflow generator 214 shown in FIG. 2). Engine framework 320 is also configured to define communication between orchestrator 340 and microservice provision components 360(1)-360(n) that execute microservices to be executed in a non-production environment. Those definitions can be passed directly to orchestrator 340 as shown by the two-way communications (depicted by a bi-directional arrow) between engine framework 320 and orchestrator 340.

Orchestrator 340 is configured to receive the formed job stream and send a plurality of tasks based on the formed job stream. The tasks are executed by respective microservice provision components 360(1)-360(n) that execute microservices enabling either the test of computer-executable code in the non-production environment or updating an operation of the microservices environment. Orchestrator 340 communicates with a manager 350 and a task queue 352. Communication completes a loop starting and ending at orchestrator 340, flowing by way of task queue 352, microservice provision components 360(1)-360(n), and manager 350.

Orchestrator 340 sends a plurality of tasks for microservices to task queue 352 based on an invoked plurality of microservices. These tasks enable the test of computer-executable code or update an operation of the microservices environment. The tasks are then sent from task queue 352 to respective microservice provision components 360(1)-360(n) that execute the invoked microservices. Completed microservices communications are received at manager 350 regarding the completed plurality of tasks that enable the test of computer-executable code or updating of an operation of the microservices environment.

As an example, in accordance with embodiments of the disclosure, a developer may want to regularize renaming of a variable associated with the previous year's tax documents, from "current_tax_form" to "2019_tax_form" based on the passage of filing deadlines. Via developer tool 110 (i.e., from a user interface of business workflow generator 214 as shown in FIG. 2), a selection of the renaming operation is selected and an alteration to the operation noted. Based on the selection, an appropriate Java Script Object Notation (JSON) file is identified in a data store (e.g., stored among one of microservice provision components 360(1)-360(n) in a central code repository).

The selection and alteration are sent as an input request from developer tool 110, along with framework specifications from engine framework 320, to form a task in formed job stream 330. Orchestrator 340 receives the alteration and transmits it to task queue 352. Task queue 352 in turn transmits the alteration to the proper component among microservice provision components 360(1)-360(n).

Responsive to the alteration, a segment of computer-executable code in the JSON file corresponding to the selected operation of renaming the variable is updated by the appropriate component. The updated workflow is in turn generated by one of microservice provision components 360(1)-360(n). Confirmation of the task completion is then communicated to manager 350 and back to orchestrator 340. The example ends with notification of completion arriving back at developer tool 110, where the developer can verify the changes. Based on the change to the JSON file, the same altered operation (i.e., "tax form change") is now available for other developers as well.

Figure 4:
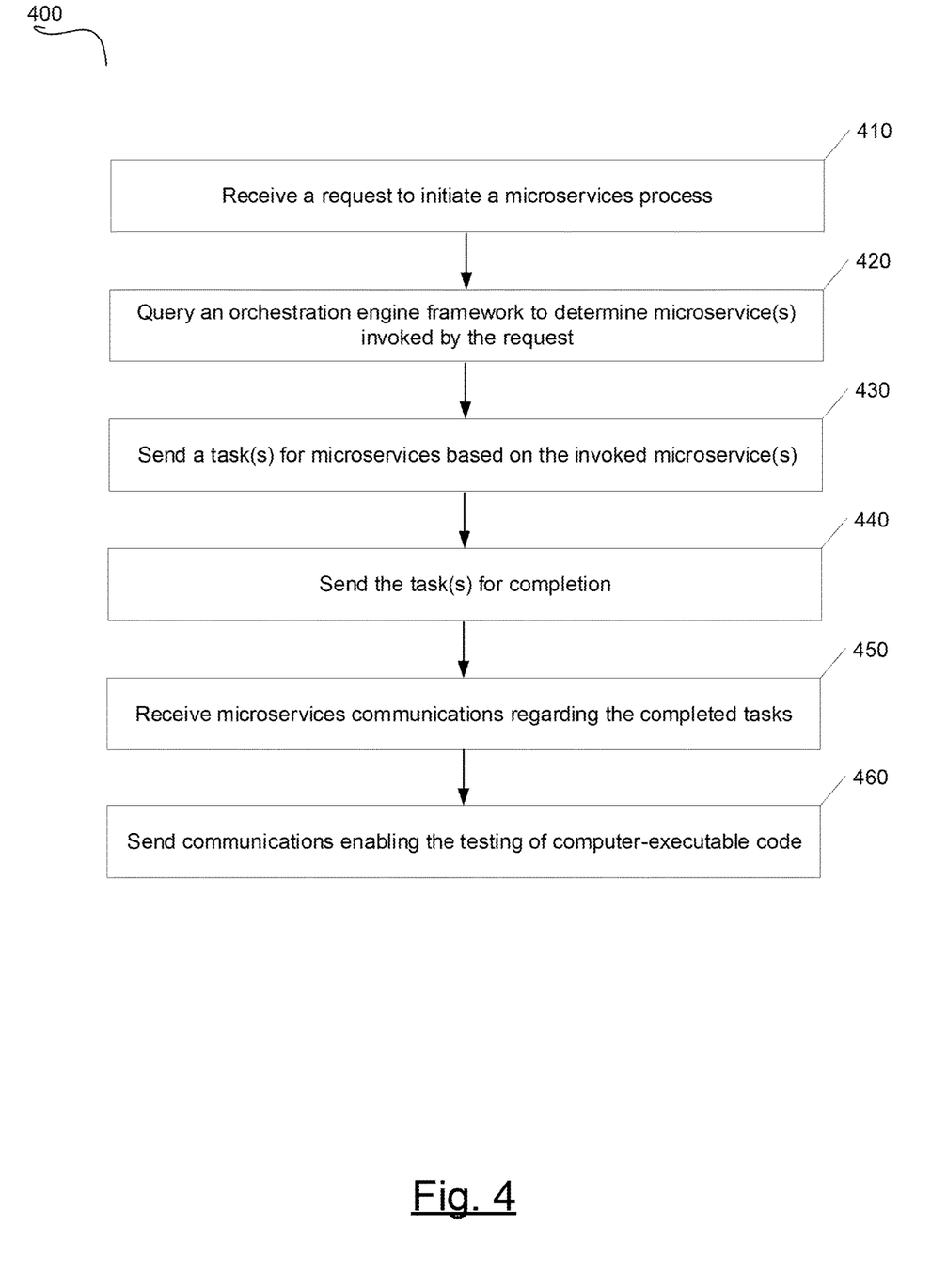
FIG. 4 is a flow chart describing a method of testing computer-executable code in a non-production environment, according to an embodiment of the disclosure.

Turning now to FIG. 4, a method of testing computer-executable code in a non-production environment 400 is depicted. Method 400 begins at a step 410, where a request is received by one or more computing devices to initiate a microservices process to be executed in a non-production environment during a test of computer-executable code. For example, the request can originate from test account generator 212 for generating test accounts.

At a step 420 an orchestration engine queries an engine framework to determine a plurality of microservices invoked by the request. In the example above, MOE 300 can query engine framework 320 to determine what microservices supplied by microservice provision components 360(1)-360(n) generate the test accounts requested by test account generator 212. The engine framework 320 will also determine what tasks will be performed to generate the test accounts, such as data stores accessed, permissions required, and the like. These will be communicated to the orchestrator, such as orchestrator 340 described above.

At a step 430, a task or a plurality of tasks are sent for microservices based on the invoked plurality of microservices. Continuing with the above example, the tasks regarding test account generation (data store access, permissions, etc.) are sent by orchestrator 340 to task queue 352. At a step 440, tasks for completion are sent to respective microservice components that execute the invoked microservices. Again following the above example, this can be a transmission of tasks from task queue 352 on to the appropriate microservice provision components 360(1)-360(n).

Completed microservices communications are received regarding the completed tasks that enable the test of computer-executable code at a step 450. In the above example, this occurs responsive to completion of the test account generation by appropriate microservice provision components 360(1)-360(n). The communication of the completed task is sent to manager 350 from the corresponding component among microservice provision components 360(1)-360(n), and then on to the orchestrator 340.

At a step 460, the completed responses to the input request and corresponding microservices communications that enable the test of computer-executable code are sent to the user interface. According to the example above, orchestrator 340 sends confirmation to test account generator 212 that test account generation has been successful and that the generated test accounts are available for developer use in the code-testing environment.

Figure 5:
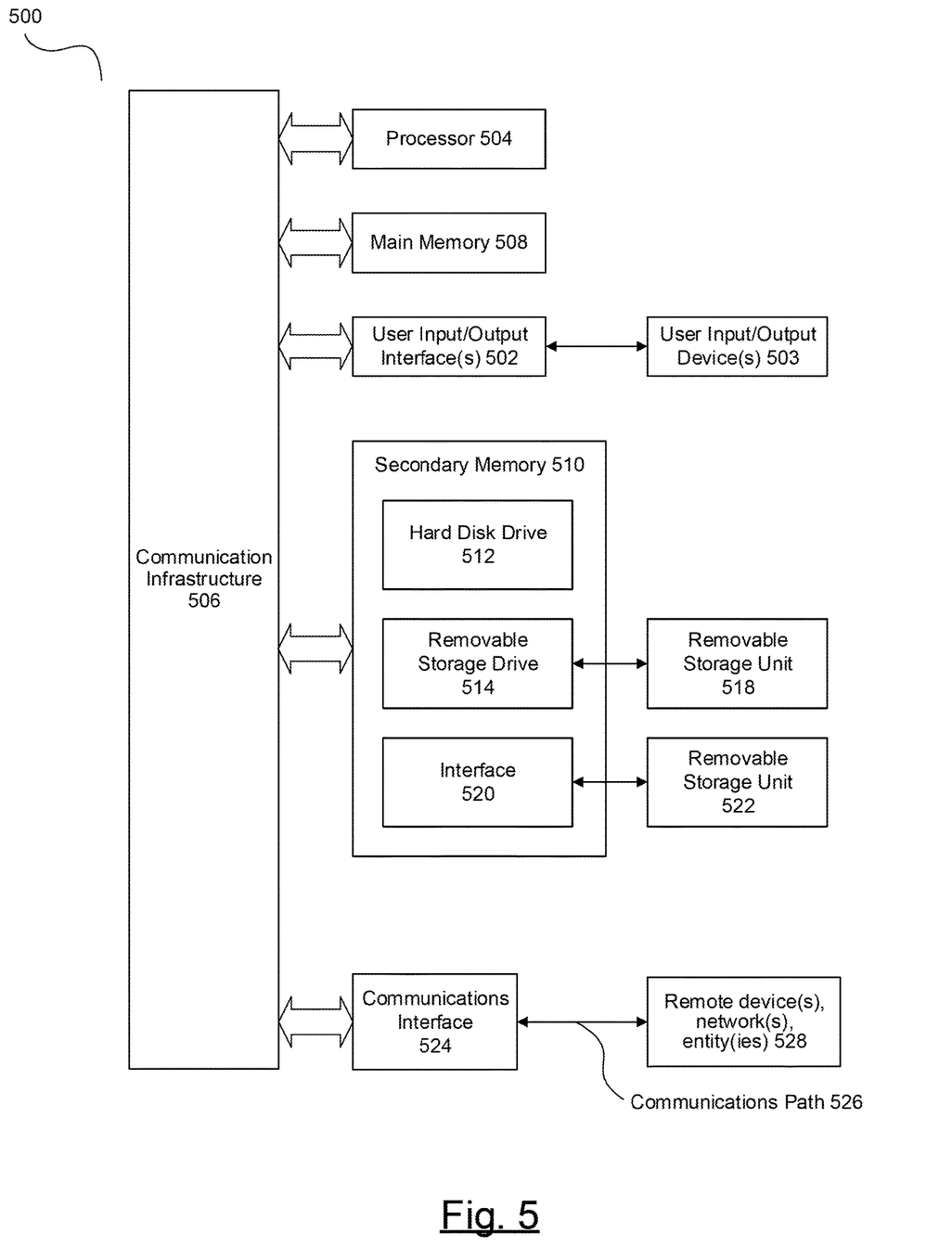
FIG. 5 is a computer system useful for implementing various embodiments.

FIG. 5 depicts an example computer system useful for implementing various embodiments. Various embodiments may be implemented, for example, using one or more well-known computer systems, such as computer system 500 shown in FIG. 5. One or more computer systems 500 may be used, for example, to implement any of the embodiments discussed herein, as well as combinations and subcombinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 406 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data. Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments of the present application as contemplated by the inventor(s), and thus, are not intended to limit the present application and the appended claims in any way.

The present application has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the application that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present application should not be limited by any of the above-described exemplary embodiments, but should be defined only in accordance with the following claims and their equivalents.

The invention claimed is:

1. A method comprising:
receiving, by a computing device, a request to test computer-executable code in a non-production environment;
determining a plurality of microservices invoked by the request, wherein each microservice of the plurality of microservices is associated with a respective microservice component;
sending, to the respective microservice component for each of the plurality of microservices, a respective task of a plurality of tasks, wherein the respective task of the respective microservice component for a microservice of the plurality of microservices requires permission to access test data used to populate a data field implemented by the computer-executable code;
receiving, based on a request sent to a server configured to store the test data as privacy-protected data, the permission to access the test data;
receiving microservices communications from the respective microservice component for each of the plurality of microservices that indicate that a respective portion of a plurality of portions of the computer-executable code associated with each respective task of the plurality of tasks is at least one of modified or operating correctly; and
identifying, based on the microservices communications that indicate that the respective portion of the plurality of portions of the computer-executable code associated with each respective task of the plurality of tasks is at least one of modified or operating correctly, a test result for the computer-executable code that simulates a real-world functioning of an application.

2. The method of claim 1, wherein the receiving the request to test the computer-executable code is based on a request to generate at least one of a test account or a business workflow.

3. A method of claim 1, wherein the sending, to the respective microservice component for each of the plurality of microservice components, the respective task comprises at least one of application programming interface (API) calls, Simple Object Access Protocol (SOAP) service calls, database calls, cloud services calls, or mainframe emulator communications.

4. The method of claim 1, wherein the sending, to the respective microservice component for each of the plurality of microservice components, the respective task comprises sending scheduling information for scheduling the plurality of microservices.

5. The method of claim 4, wherein the scheduling the plurality of microservices comprises dynamically updating the plurality of microservices based on parameters received from an orchestration engine framework.

6. The method of claim 4, wherein the scheduling the plurality of microservices comprises dynamically updating the plurality of microservices based on a request received via a user interface.

7. A non-transitory computer-readable medium having instructions stored thereon that, when executed by at least one computing device, cause the at least one computing device to perform operations comprising:
receiving a request to test computer-executable code in a non-production environment;
determining a plurality of microservices invoked by the request, wherein each microservice of the plurality of microservices is associated with a respective microservice component;
sending, to the respective microservice component for each of the plurality of microservices, a respective task of a plurality of tasks, wherein the respective task of the respective microservice component for a microservice of the plurality of microservices requires permission to access test data used to populate a data field implemented by the computer-executable code;

receiving, based on a request sent to a server configured to store the test data as privacy-protected data, the permission to access the test data;

receiving microservices communications from the respective microservice component for each of the plurality of microservices that indicate that a respective portion of a plurality of portions of the computer-executable code associated with each respective task of the plurality of tasks is at least one of modified or operating correctly; and identifying, based on the microservices communications that indicate that the respective portion of the plurality of portions of the computer-executable code associated with each respective task of the plurality of tasks is at least one of modified or operating correctly, a test result for the computer-executable code that simulates a real-world functioning of an application.

8. The non-transitory computer-readable medium of claim 7, wherein the request to test the computer-executable code is based on a request to generate at least one of a test account or a business workflow.

9. The non-transitory computer-readable medium of claim 7, wherein the sending, to the respective microservice component for each of the plurality of microservice components, the respective task comprises at least one of application programming interface (API) calls, Simple Object Access Protocol (SOAP) service calls, database calls, cloud services calls, or mainframe emulator communications.

10. The non-transitory computer-readable medium of claim 7, wherein the sending, to the respective microservice component for each of the plurality of microservice components, the respective task comprises sending scheduling information for scheduling the plurality of microservices.

11. The non-transitory computer-readable medium of claim 10, wherein the scheduling the plurality of microservices comprises dynamically updating the plurality of microservices based on parameters received from an orchestration engine framework.

12. The non-transitory computer-readable medium of claim 10, wherein the scheduling the plurality of microservices comprises dynamically updating the plurality of microservices based on a request received via a user interface.

13. The non-transitory computer-readable medium of claim 7, wherein the respective task of the respective microservice component for another microservice of the plurality of microservices comprises an exchange of one or more extensible markup language files.

14. A system, comprising:
a memory; and
a processor configured to execute operations from the memory, the operations comprising:
receiving a request to test computer-executable code in a non-production environment;

determining a plurality of microservices invoked by the request, wherein each microservice of the plurality of microservices is associated with a respective microservice component;

sending, to the respective microservice component for each of the plurality of microservices, a respective task of a plurality of tasks, wherein the respective task of the respective microservice component for a microservice of the plurality of microservices requires permission to access test data used to populate a data field implemented by the computer-executable code;

receiving, based on a request sent to a server configured to store the test data as privacy-protected data, the permission to access the test data;

receiving microservices communications from the respective microservice component for each of the plurality of microservices that indicate that a respective portion of a plurality of portions of the computer-executable code associated with each respective task of the plurality of tasks is at least one of modified or operating correctly; and identifying, based on the microservices communications that indicate that the respective portion of the plurality of portions of the computer-executable code associated with each respective task of the plurality of tasks is at least one of modified or operating correctly, a test result for the computer-executable code that simulates a real-world functioning of an application.

15. The system of claim 14, wherein the receiving the request to test the computer-executable code is based on a request to generate at least one of a test account or a business workflow.

16. A system of claim 14, wherein the sending, to the respective microservice component for each of the plurality of microservice components, the respective task comprises at least one of application programming interface (API) calls, Simple Object Access Protocol (SOAP) service calls, database calls, cloud services calls, or mainframe emulator communications.

17. The system of claim 14, wherein the sending, to the respective microservice component for each of the plurality of microservice components, the respective task comprises sending scheduling information for scheduling the plurality of microservices.

18. The system of claim 17, wherein the scheduling the plurality of microservices comprises dynamically updating the plurality of microservices based on parameters received from an orchestration engine framework.

19. The system of claim 17, wherein the scheduling the plurality of microservices comprises dynamically updating the plurality of microservices based on a request received via a user interface.

20. The system of claim 14, wherein the respective task of the respective microservice component for another microservice of the plurality of microservices comprises an exchange of one or more extensible markup language files.

* * * * *